(12) United States Patent
Sigona (10) Patent No.: US 9,745,210 B2
(45) Date of Patent: Aug. 29, 2017

(54) AIR GAP CATCH

(71) Applicant: Jon-Andrew Vincent Sigona, Scottsdale, AZ (US)

(72) Inventor: Jon-Andrew Vincent Sigona, Scottsdale, AZ (US)

(*) Notice: Subject to any disclaimer, the term of this patent is extended or adjusted under 35 U.S.C. 154(b) by 0 days.

(21) Appl. No.: 14/848,137

(22) Filed: Sep. 8, 2015

(65) Prior Publication Data

US 2017/0067237 A1 Mar. 9, 2017

(51) Int. Cl.
*E03C 1/10* (2006.01)
*C02F 1/44* (2006.01)
*B01D 61/10* (2006.01)

(52) U.S. Cl.
CPC .............. *C02F 1/441* (2013.01); *B01D 61/10* (2013.01); *B01D 2313/12* (2013.01); *Y10T 137/3185* (2015.04)

(58) Field of Classification Search
CPC ... E03C 1/102; E03C 1/12; E03C 1/24; Y10T 137/3185; Y10T 3/3222; E03F 5/042; E03D 11/00
See application file for complete search history.

(56) References Cited

U.S. PATENT DOCUMENTS

| | | | | |
|---|---|---|---|---|
| 4,467,830 A * | 8/1984 | Hutchinson | ............ | E03C 1/102 137/216 |
| 4,856,559 A | 8/1989 | Lipshultz et al. | | |
| 5,147,533 A | 9/1992 | Lipshultz et al. | | |
| 5,797,419 A * | 8/1998 | Perrott | .................... | E03C 1/102 137/118.05 |
| 5,860,444 A * | 1/1999 | Guendjoian | ............ | E03C 1/102 137/216 |
| 8,266,735 B2 * | 9/2012 | McLeod | ................... | E03C 1/24 4/494 |

* cited by examiner

*Primary Examiner* — Craig Schneider
*Assistant Examiner* — Kevin Barss
(74) *Attorney, Agent, or Firm* — Bycer Law, PLC; Matthew L. Bycer (57) ABSTRACT

Apparatus and method for directing waste water discharged from the air gap port of an air gap device such as an air gap reverse osmosis (RO) faucet or a dishwasher air gap, whereby the discharged water is caught and collected in a cup or container surrounding the air gap and channeled by a conduit of sufficient distance so that the water may then discharge into the sink basin.

11 Claims, 8 Drawing Sheets

PRIOR ART

AIR GAP CATCH

FIELD OF THE INVENTION

The present invention relates to household wastewater management. More particularly, this invention relates to effluent diverting systems for kitchen sinks.

BACKGROUND OF THE INVENTION

The purpose of an air gap, in an air gap reverse osmosis system (RO) faucet or dishwasher air gap is to prevent back flow from contaminated waste water from a sewage or septic system from flowing backward into a residential dishwasher or reverse osmosis drinking water purification system, contaminating them, and further, preventing the contaminated back flow from intruding into the greater municipal or well water system. The common air gap RO faucet and dishwasher air gap all feature a waste water line from the water using system such as a residential reverse osmosis system or dishwasher, into the air gap device, through the gap which is vented to the atmosphere through an exposed opening in the air gap apparatus known as the air gap window, and then through a larger tube into which the waste water can then enter into the home's waste water sewage or septic system. It is understood that inherent with this design is that if the larger waste water system has inadequate drainage, waste water will fail to drain from the reverse osmosis system or dishwasher into the intended drain system and instead back up and discharge from the air gap window. When used in conjunction with a surface mount sink the waste water would then trickle back into the sink basin causing little or no harm. However when installed on an under mount sink, the use of both dishwasher air gap and air gap fixtures has become a household hazard. When used on an under mount sink application the waste water which has backed up through the air gap window is not channeled anywhere, and will spread across the sink counter top making a huge mess, then flows onto the floor, potentially damaging the floor, and creating a slip-and-fall hazard.

BRIEF SUMMARY OF THE INVENTION

This invention fits around the base of an air gap device, or between the base of the device and top surface of the countertop. With an integrated basin it catches the backup waste water pouring forth from the air gap window and directs it into the sink basin through an integrated spout. Lipshultz U.S. Pat. No. 4,856,559 taught us that the waste water from reverse osmosis system can be directed into the sink basin via a spout in place of the air gap window removing the need for an under sink drain connection entirely. However it required that the Lipshultz invention be used in place of a conventional air gap RO faucet. This invention is a substantial improvement as it can be used with an virtually any commercially available air gap RO faucet available saving a great deal of time and cost, and additionally in a second embodiment when this invention is constructed from a flexible material such as rubber it can be applied to an existing air gap RO faucet without the need to remove said faucet—it fits over the top and seals around the faucet's base. This invention can also be used with a dishwasher air gap as well for that same purpose, and with the same benefits.

The present invention includes a novel way to direct, or retrofit an existing system, to direct effluent wastewater or brine (herein "brine") that might overflow from an air gap on a kitchen counter sink, particularly an undermount sink with an air gap mounted on the plane of the counter top. An overflow dispensation director adapted for use with an air gap, particularly with water purification system brine or dishwasher wastewater, wherein the director redirects falling liquid from the air gap over a portion of the countertop and into the sink. The director has a generally flat underside for mounting and mating with the countertop, and a center opening adapted for use around at least a lower portion of an air gap body, typically a column structure or riser above the countertop. The center opening preferably has an edge adapted to mate with the outer surface of the air gap body. The director top includes a contiguous channel surrounding the center opening to collect and direct brine overflow falling front the air gap and directs the overflow to an extending outlet long enough to pass over the countertop space between the air gap and the sink edge. As stated, the bottom is preferably a generally planar surface so that the bottom can mate with the countertop. As a side note, the countertop on an undermount is typically a contiguous plane that allows water to drop into the sink and often over another edge, such as onto the floor from the same elevation (without any intervening walls or surface pattern). The floor is often without a drain, and water flowing off the countertop onto the floor often sits because there is no floor drain.

The director preferably includes an outer sidewall around the contiguous channel to better direct flow over the outlet. Water flows from the channel through a break in the wall into the outlet. The extending outlet should have a length sufficient to direct water directly into the sink cavity. The end of the outlet may have a lip, the lip may be curled partially or fully into a spout, or downwardly directed. The lip or the outlet may also be perforated to allow the lip, or the outlet to be cut or truncated depending on countertop distance from air gap to sink. The director's outer sidewall should surround a larger portion of the channel, and may have a flat edge (defining a plane, preferably parallel with the countertop plane.

The center opening edge preferably mates with the entirety of the circumference of the riser body, or an internal component, thus preferably making a seal. An upwardly directed flange or lip can be placed within the center opening to better fits and mate twit the body. The director may also be hard plastic or metal, or flexible plastic or rubber. When flexible a center strip opening may be provided to allow the opening to enlarge and accommodate the riser body and be placed over it as an after-market product.

The present invention also includes a method of directing brine overflowing from an air gap by providing a collar with a center opening, a contiguous channel, and an outlet. The collar is placed around the air gap body, guided over the body, and mounted on a top surface of a countertop, wherein the collar outlet is positioned over a sink basin. Preferably, the center opening of the collar is mating with the entirety of the air gap body outer surface.

BRIEF DESCRIPTION OF THE DRAWINGS

FIG. 413 demonstrates a top perspective view of an embodiment of the present invention.

DETAILED DESCRIPTION OF THE INVENTION

This invention is intended to catch, direct and safely dispose of the waste water discharged from the air gap window opening of an air gap RO faucet or dishwasher air gap device. Air gap RO faucets and dishwasher air gap devices routinely discharge waste water out of the air gap window in response to insufficient residential sewer or septic drainage. When the air gap device is installed on a surface mount sink the air gap waste water would normally trickle back down into the sink basin and into the sink drain not causing a problem. However when the air gap device is installed directly on top of a kitchen countertop such as with the case with an under mount sink, the air gap waste water discharged from the air gap window is not directed into the sink basin, instead it is allowed to freely spread out across the countertop, fall to the floor where it can damage the flooring and create a slip and fall hazard.

This invention may be made of a less flexible material such as metal or plastic, and formed, molded or stamped. Alternatively it may be molded from flexible material such as rubber. The difference in material choice being the intended application. The harder material, which affords some structural support, would typically be used in conjunction with a new air gap device installation where the air gap device would rest on top of the invention. One would then use a gasket to create a water tight seal between the base of the air gap device and the surface of the invention. The invention made from the softer more flexible material can easily be retrofitted to an existing air gap device, where the flexible material would be expected to slip fit over the top of the existing air gap device installation and seal around its base. In operation, when waste water is discharged from the air gap window, it flows down the side of the air gap device, is caught in the invention's basin area, and directed out, over the lip and disposed of successfully and safely down into the sink basin. The size of the invention's wall and basin area can be configured to support the anticipated flow rate from the specific air gap device. For example the invention designed for a dishwasher air gap application will be larger in all dimensions than the invention designed for the air gap RO faucet application. Novelty and non-obviousness: Air gap devices have been in common use for decades and the waste water discharge design flaw has been in evidence for a similar time period. Lipshultz U.S. Pat. No. 4,856,559 invented an air gap RO faucet that did not have this design flaw while still meeting the needs satisfied by the air gap feature, however it did not provide a remedy for the existing, and still commonly employed air gap RO faucet, nor did it even apply to dishwasher air gap devices, as does this invention. Also its air gap spout is much more obtrusive, whereas this invention lies flush with the countertop, and can be rotated so that its protrusion into the sink basin is minimal, and with the embodiment made from flexible material it can be trimmed to fit flush with both the countertop and the sink basin. It is a novel, non-obvious invention.

Figure 1A:
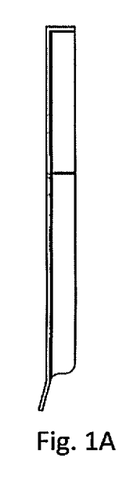
FIG. 1A demonstrates a left side view of an embodiment of the present invention.
Figure 1B:
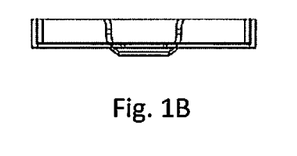
FIG. 1B demonstrates a frontal view of an embodiment of the present invention.
Figure 1C:
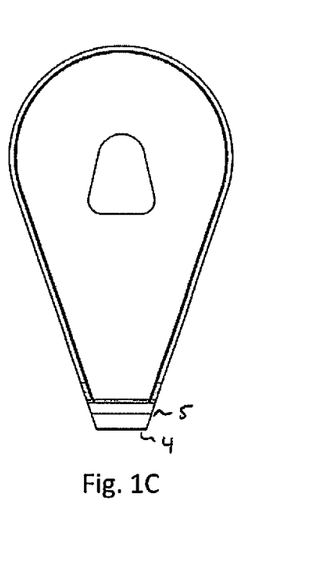
FIG. 1C demonstrates a top view of an embodiment of the present invention.
Figure 1D:
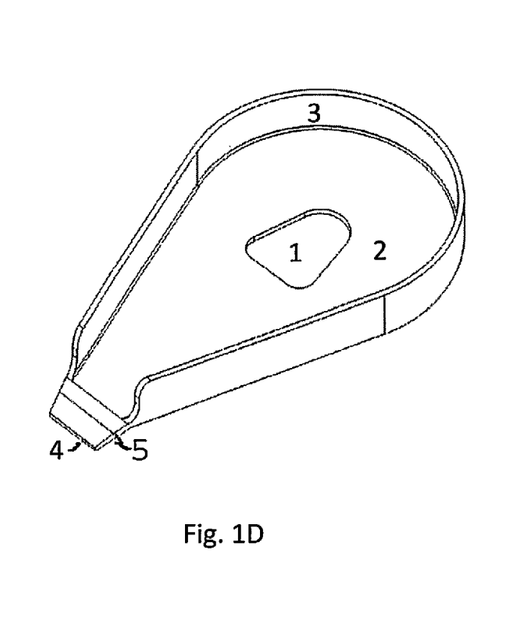
FIG. 1D demonstrates a top perspective view of an embodiment of the present invention.
Figures 2A, 2B:
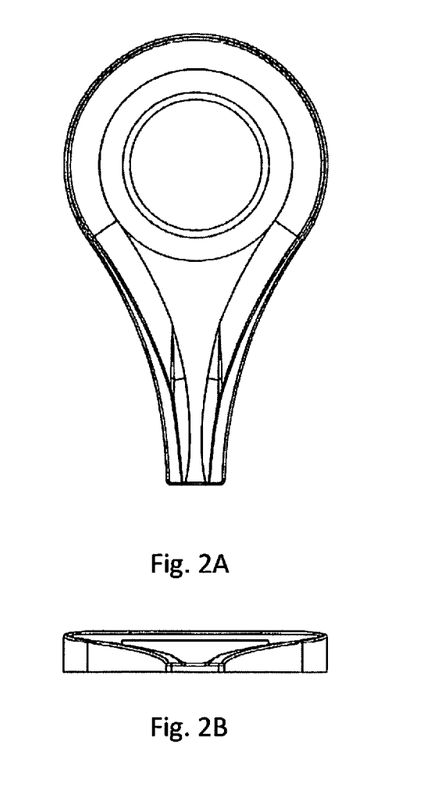
FIG. 2A demonstrates a top view of an embodiment of the present invention.
FIG. 2B demonstrates a frontal view of an embodiment of the present invention.
Figure 2C:
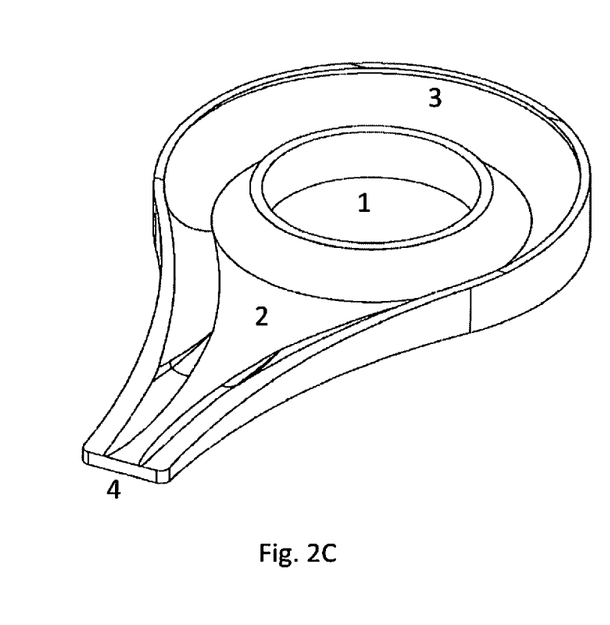
FIG. 2C demonstrates a top perspective view of an embodiment of the present invention.
Figure 3A:
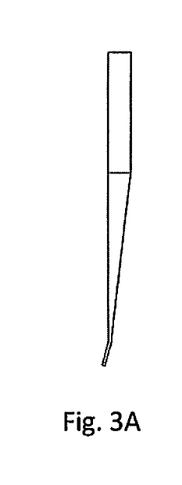
FIG. 3A demonstrates a left side view of an embodiment of the present invention.
Figure 3B:
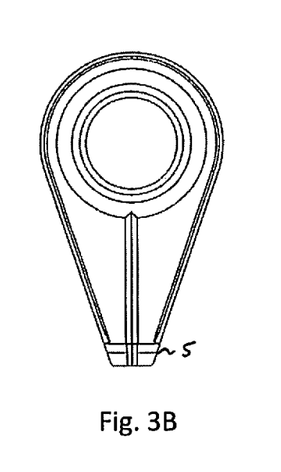
FIG. 3B demonstrates a top view of an embodiment of the present invention.
Figure 3C:
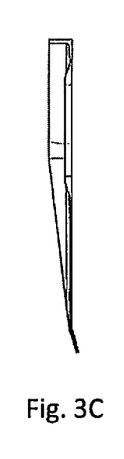
FIG. 3C demonstrates a right side view of an embodiment of the present invention.
Figure 3D:
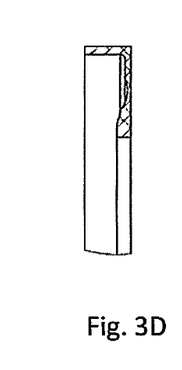
FIG. 3D demonstrates an angled frontal view of an embodiment of the present invention.
Figure 3E:
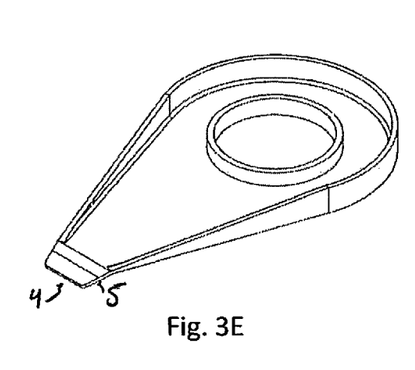
FIG. 3E demonstrates a top perspective view of an embodiment of the present invention.
Figure 3F:
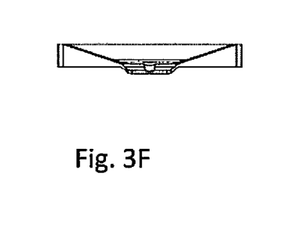
FIG. 3F demonstrates a frontal view in additional detail of an embodiment of the present invention.
Figure 3G:
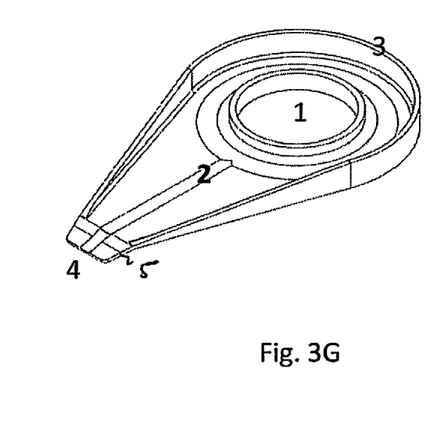
FIG. 3G demonstrates a top perspective view in additional detail of an embodiment of the present invention.
Figure 4A:
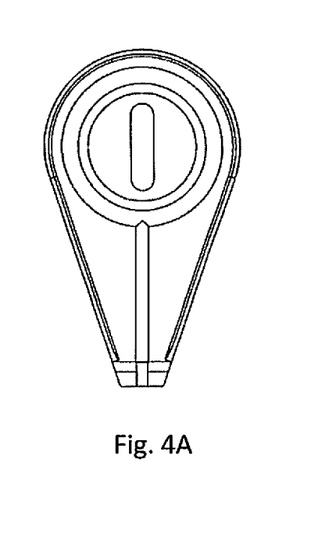
FIG. 4A demonstrates a top view of an embodiment of the present invention.
Figure 4B:
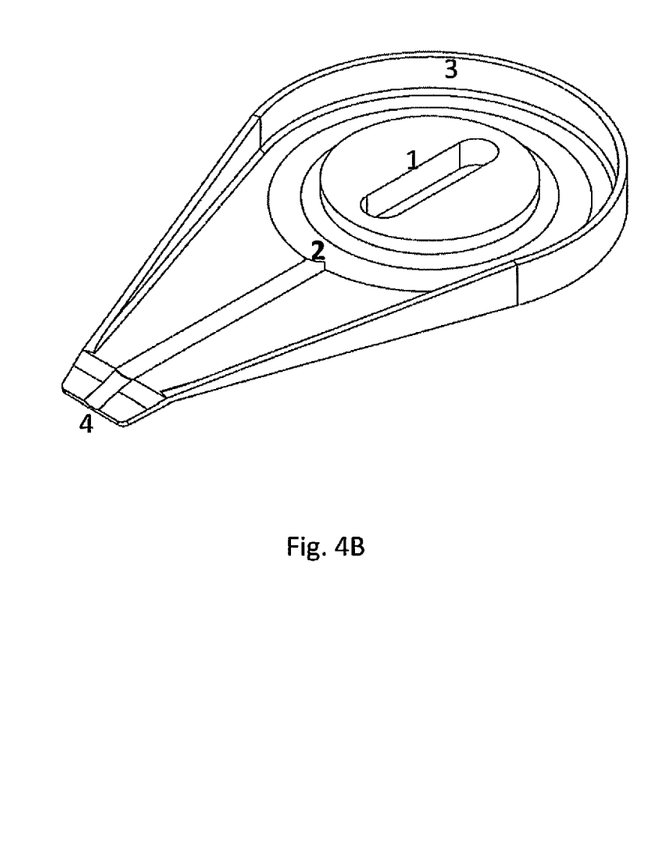
Figure 5A:
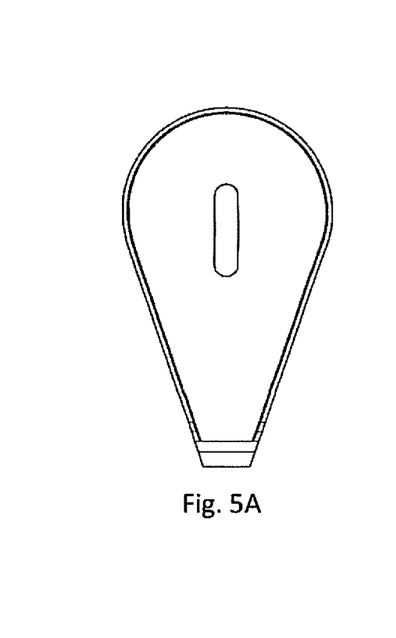
FIG. 5A demonstrates a top view of an embodiment of the present invention.
Figure 5B:
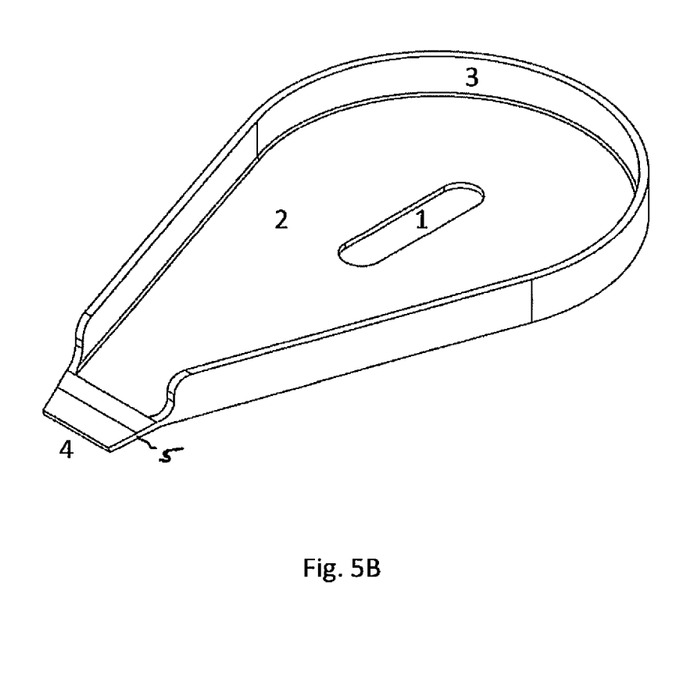
FIG. 5B demonstrates a top perspective view of an embodiment of the present invention.

The present invention may be more readily understood by reference to the accompanying drawings in which FIG. 1 shows the invention embodiment which fits air gap RO faucets, and is intended to be made of a less flexible material such as plastic or metal. FIG. 2 shows the invention embodiment which fits air gap RO faucets and dishwasher air gaps, and is intended to be made of a flexible material such as rubber so as to be easily retrofitted to an existing, previously installed air gap device. FIG. 3 shows a version of FIG. 1 with additional bevels and compound curves to facilitate fluid transfer. FIGS. 4 and 5 show the device with a slit opening when may be smaller or larger than shown and the device may be made from solid or flexible material to better make use of the slit opening to fit around a variety of different shaped air gap devices.

FIG. 1, 1 shows an opening in which an air gap RO faucet may be fitted. The opening may be round to accommodate a wider variety of air gap devices. Shown here with opening tailored to fit the common industry standard air gap RO faucet.

FIG. 1, 2 shows a cup or basin area in which fluid may be collected and directed. This area may be level for simplicity of manufacture, or sloped to make a path to facilitate fluid transfer. Shown level.

FIG. 1, 3 shows the side wall of the invention which contains the fluid. Wall may be of equal height or sloped for aesthetic or practical purposes.

FIG. 1, 4 shows the termination point of the invention where the fluid would discharge. This termination point may be a lip or spout. Shown here with a downward angled lip.

FIG. 1, 5 shows location of optional perforation on lip, wherein lip may be perforated so as to facilitate trimming of the lip for a better fit.

FIG. 2, 1 shows an opening in which and air gap RO faucet or dishwasher air gap may be fitted. Round opening shown can accommodate a wider variety of air gap devices. Other embodiments can have an opening tailored to fit other specific brands of air gap devices.

FIG. 2, 2 shows a cup or basin area in which fluid may be collected and directed. This area shown is sloped to direct the fluid.

FIG. 2, 3 shows the side wall of the invention which contains the fluid. Wall may be of equal height or sloped for aesthetic or practical purposes. Wall shown here is sloped to direct fluid and also for aesthetic purposes.

FIG. 2, 4 shows the termination point of the invention where the fluid would discharge. This termination point may be a lip or spout. Shown as a lip, which also may be perforated so as to facilitate trimming of the lip for a better fit.

FIG. 3, 1 shows an opening in which and air gap RO faucet or dishwasher air gap may be fitted. Round opening shown can accommodate a wider variety of air gap devices. Other embodiments can have the opening tailored to fit other specific brands of air gap devices.

FIG. 3, 2 shows a cup or basin area in which fluid may be collected and directed. This area shown is sloped to direct the fluid.

FIG. 3, 3 shows the side wall of the invention which contains the fluid. Wall may be of equal height or sloped for aesthetic or practical purposes. Wall shown here is sloped to direct fluid and also for aesthetic purposes.

FIG. 3, 4 shows the termination point of the invention where the fluid would discharge. This termination point may be a lip or spout. Shown here with a downward angled lip.

FIG. 4, 1 shows a slit opening in which and air gap RO faucet or dishwasher air gap may be fitted. Slit opening shown can accommodate a wider variety of air gap devices when the device is made from flexible material. Other embodiments can have the opening tailored to fit other specific brands of air gap devices.

FIG. 4, 2 shows a cup or basin area in which fluid may be collected and directed. This area shown is sloped to direct the fluid.

FIG. 4, 3 shows the side wall of the invention which contains the fluid. Wall may be of equal height or sloped for aesthetic or practical purposes. Wall shown here is sloped to direct fluid and also for aesthetic purposes.

FIG. 4, 4 shows the termination point of the invention where the fluid would discharge. This termination point may be a lip or spout. Shown here with a downward angled lip.

FIG. 5, 1 shows a slit opening in which and air gap RO faucet or dishwasher air gap may be fitted. Slit opening shown can accommodate a wider variety of air gap devices when the device is made from flexible material. Other embodiments can have the opening tailored to fit other specific brands of air gap devices with alternate shaped opening such as square or a polygon.

FIG. 5, 2 shows a cup or basin area in which fluid may be collected and directed. This area may be level for simplicity of manufacture, or sloped to make a path to facilitate fluid transfer. Shown level.

FIG. 5, 3 shows the side wall of the invention which contains the fluid. Wall may be of equal height or sloped for aesthetic or practical purposes. Shown level.

FIG. 5, 4 shows the termination point of the invention where the fluid would discharge. This termination point may be a lip or spout. Shown here with a downward angled lip.

Figure 6:
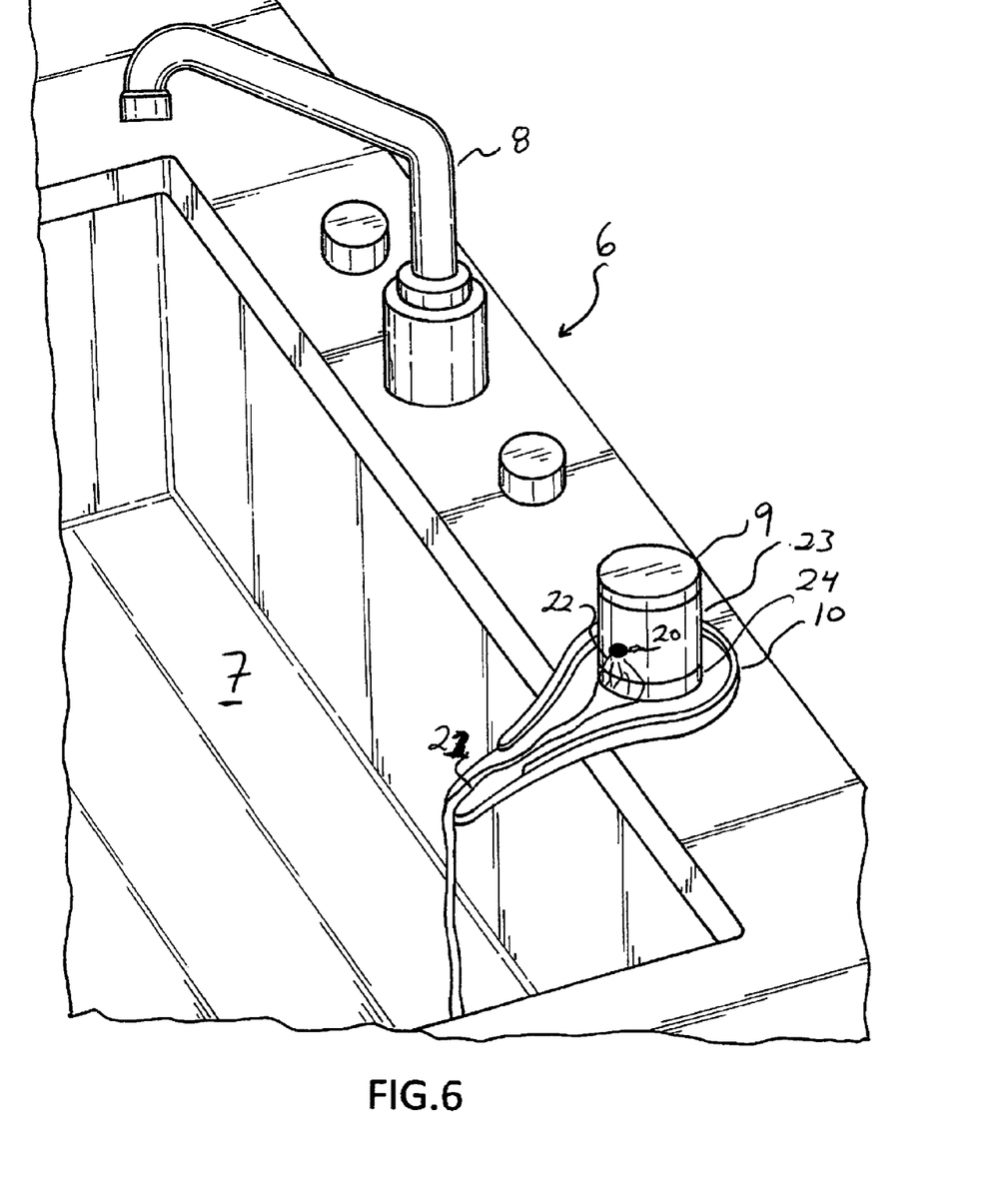
FIG. 6 demonstrates a close-up partial view of a typical sink/faucet with an embodiment of the present invention installed.

FIG. 6 demonstrates a close up view of the back end 6 of a sink basin 7 with standard faucet 8 and air gap RO faucet 9 with an embodiment of the present invention air gap catch 10 installed. Air gap catch 10 installed on lower body 24 (below air gap 20) of air gap riser 23 allowing water 21 to flow down side 22 of air gap riser 23 and into sink basin 7.

Figure 7:
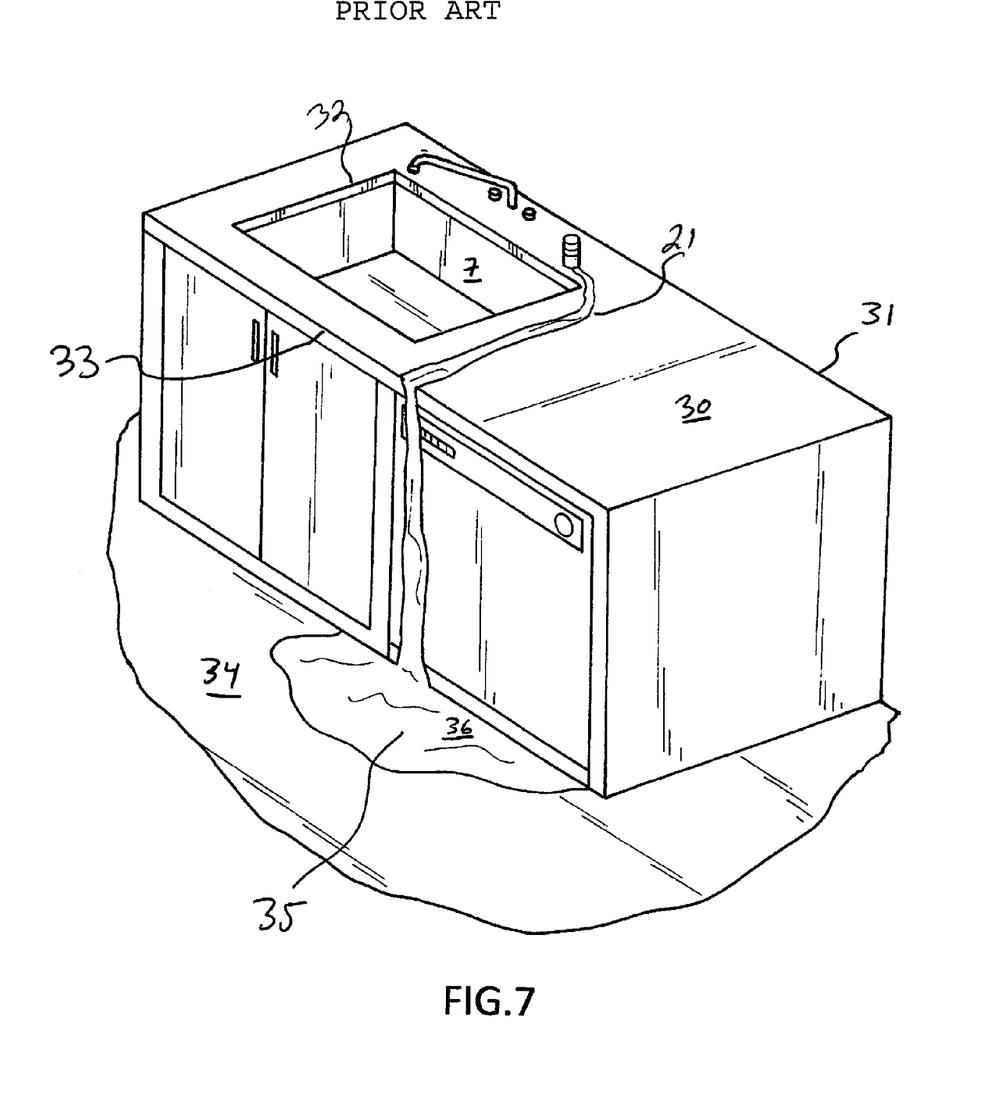
FIG. 7 demonstrates a perspective view of typical sink/faucet of the prior art without an embodiment of the invention installed.

FIG. 7 demonstrates a sink basin 7 arranged in a countertop 30 defining a plane 31 with a first drain edge 32, such as over an undermount sink basin 7 (as shown) and a second edge 33, whereby water 21 to drip/spill over second edge 33 and onto floor 34. Water flowing off the countertop onto the floor often sits because there is no floor drain. Floor 34 including a lowest surface 35 without a drain (not shown) such that water pools in pool 36 at a non-draining local minimum (lowest surface 35 on local floor).

Figure 8:
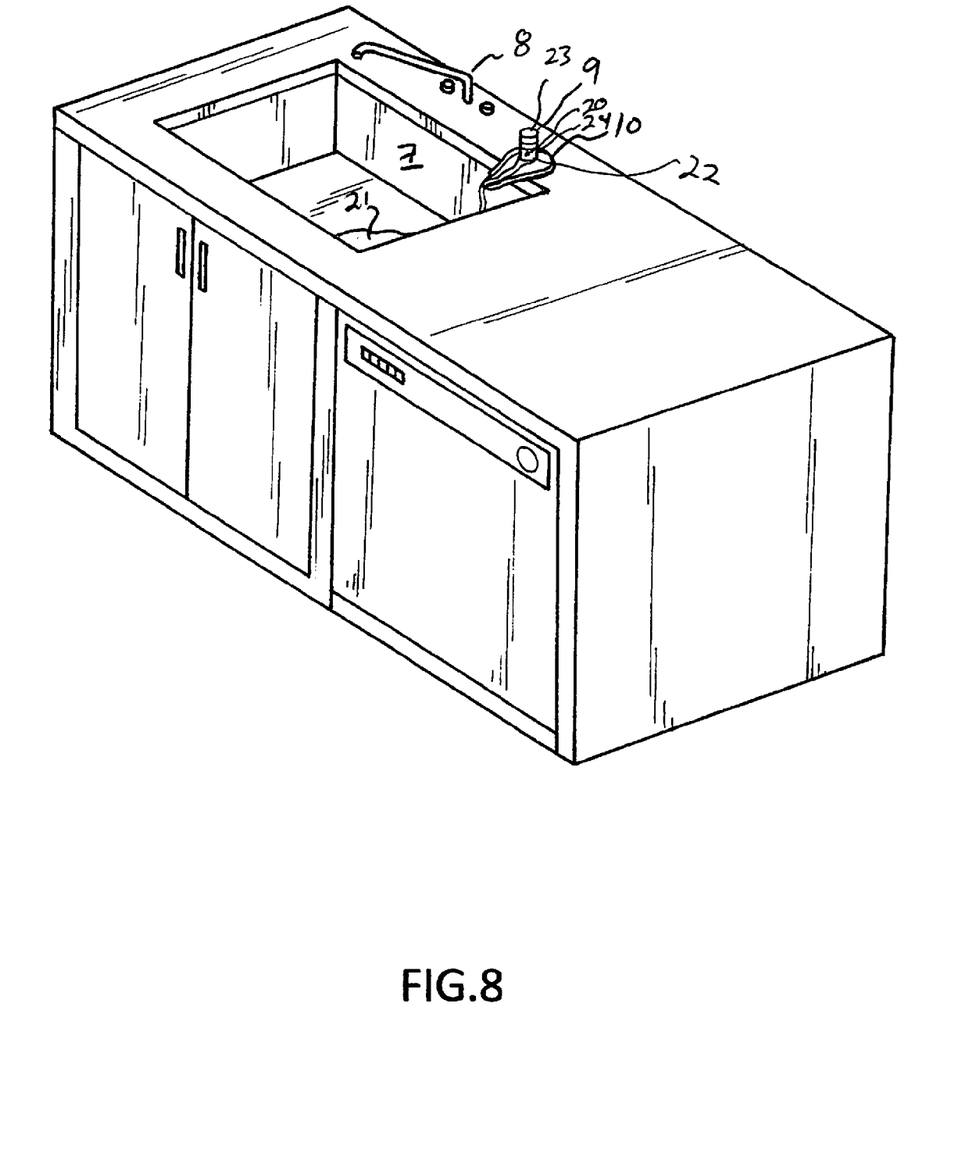
FIG. 8 demonstrates a perspective view typical sink/faucet with an embodiment of the present invention installed.

FIG. 8 demonstrates sink basin 7 with standard faucet 8 and air gap RO faucet 9 with an embodiment of the present invention air gap catch 10 installed with air gap 20 installed on lower body 24 (below air gap 20) of air gap riser 23 allowing water 21 to flow down side 22 of air gap riser 23 and into sink basin 7.

I claim:

1. An overflow dispensation director adapted for use with an air gap, said director capable of directing brine overflowing an air gap, said director comprising:
   a. a center opening adapted for use around at least a lower portion of an air gap riser body, said lower portion being below an air gap, said center opening comprising an edge adapted to mate with at least an outer surface of said at least a lower portion of an air gap riser body;
   b. a top comprising an extending outlet and a contiguous channel surrounding said center opening, said contiguous channel adapted for receiving brine overflow falling from the air gap and directing the brine overflow to said extending outlet;
   c. a bottom comprising a generally planar surface and defining a bottom plane, said bottom adapted to mate with a countertop and support said director, said countertop comprising a contiguous plane, said contiguous plane being parallel with said bottom plane and said contiguous plane comprising at least one edge mating with a sink and at least a second edge comprising a drop to basin with a non-draining local minimum;
   d. an outer sidewall around at least a portion of said contiguous channel for containing brine within said channel and further directing the brine overflow to said extending channel;
   e. a break in said outer sidewall to allow outflow of brine from said contiguous channel; and
   f. said extending outlet emanating from said break, said extending outlet adapted to direct brine overflowing from said contiguous channel over at least a portion of said countertop, to discharge into a sink basin.

2. The overflow dispensation director of claim 1, wherein said extending outlet comprises a far end located opposite said center, said far end comprising a lip appended to said far end.

3. The brine overflow dispensation director of claim 2, wherein said wherein said lip is downwardly angled relative to the plane of said bottom.

4. The overflow dispensation director of claim 2, wherein said lip comprises at least one cross-wise perforation to allow trimming of a length of said lip.

5. The overflow dispensation director of claim 1, wherein said extending outlet comprises a spout.

6. The overflow dispensation director of claim 1, wherein said outer sidewall surrounds a majority of said at least a portion of said contiguous channel.

7. The overflow dispensation director of claim 1, wherein said outer sidewall comprises a generally planar top edge.

8. The overflow dispensation director of claim 7, wherein said edge is adapted to mate with the entire circumference of the outer surface of said at least a lower portion of the air gap riser body.

9. The overflow dispensation director of claim 8, wherein said edge comprises an interior flange emanating upwards, said interior flange adapted for mating with the outer surface of said at least a lower portion of the air gap riser body.

10. The overflow dispensation director of claim 1, wherein said flange is comprised of a flexible material to adapt to mate with at least an outer surface of said at least a lower portion of the air gap riser body.

11. The overflow dispensation director of claim 1, wherein said director is comprised of a flexible substance.

* * * * *